(12) United States Patent
Choi et al.

(10) Patent No.: US 9,547,381 B2
(45) Date of Patent: Jan. 17, 2017

(54) ELECTRONIC DEVICE AND TOUCH SENSING METHOD THEREOF

(71) Applicant: SAMSUNG ELECTRONICS CO., LTD., Suwon-si (KR)

(72) Inventors: Hyun-mook Choi, Seoul (KR); Kyoung-oh Choi, Seoul (KR); Young-ran Han, Seoul (KR); Jong-hoon Kim, Suwon-si (KR); Jeong-hyun Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 159 days.

(21) Appl. No.: 14/177,324

(22) Filed: Feb. 11, 2014

(65) Prior Publication Data

US 2015/0002413 A1 Jan. 1, 2015

(30) Foreign Application Priority Data

Jun. 28, 2013 (KR) ........................ 10-2013-0075691

(51) Int. Cl.
*G06F 3/041* (2006.01)
(52) U.S. Cl.
CPC ............. *G06F 3/041* (2013.01); *G06F 3/0416* (2013.01)
(58) Field of Classification Search
CPC ............ G06F 3/02; G06F 3/041; G06F 3/045; G09G 5/00; G06K 11/06; G08C 21/00
See application file for complete search history.

(56) References Cited

U.S. PATENT DOCUMENTS

| 2009/0295764 | A1* | 12/2009 | Lin  | G09G 5/003 345/204 |
| 2010/0259368 | A1* | 10/2010 | Fahn | G06F 3/041 340/384.1 |
| 2012/0306927 | A1* | 12/2012 | Lee  | G06F 3/041 345/660 |
| 2013/0127758 | A1* | 5/2013  | Kim  | G06F 3/041 345/173 |
| 2014/0009407 | A1* | 1/2014  | Kim  | G06F 3/041 345/173 |
| 2014/0028595 | A1* | 1/2014  | Lee  | G06F 3/04883 345/173 |

FOREIGN PATENT DOCUMENTS

WO 2006/127466 A2 11/2006

OTHER PUBLICATIONS

Communication dated Mar. 4, 2015 issued by the European Patent Office in counterpart European Patent Application No. 14156653.9.

* cited by examiner

*Primary Examiner* — Pegeman Karimi
(74) *Attorney, Agent, or Firm* — Sughrue Mion, PLLC

(57) ABSTRACT

An electronic device is provided, which includes a touch sensor configured to sense a touch input to a screen, a storage configured to store different firmware corresponding to a plurality of input modes supported by the touch sensor, and a controller configured to sense the touch input according to a selected input mode among the plurality of input modes, through execution of one of the different firmware corresponding to the selected input mode.

14 Claims, 5 Drawing Sheets

ELECTRONIC DEVICE AND TOUCH SENSING METHOD THEREOF

CROSS-REFERENCE TO RELATED APPLICATION

This application claims priority from Korean Patent Application No. 10-2013-0075691, filed on Jun. 28, 2013, in the Korean Intellectual Property Office, the disclosure of which is incorporated herein by reference in its entirety.

BACKGROUND

1. Field

Apparatuses and methods consistent with exemplary embodiments relate to an electronic device and a touch sensing method thereof, and more particularly to an electronic device and a touch sensing method thereof, which can sense a touch that is input to a screen in an infrared sensor method.

2. Description of the Related Art

Recently, with the development of electronic technology, various electronic devices that can provide various functions through touch operations have been developed. Such electronic devices sense user's touch operations using various methods, such as a resistive method, a capacitive method, and an infrared method.

With regard to electronic devices adopting an infrared method in the related art, user's intended uses for these devices are not considered. That is, constant functions are supported regardless of what reason users use the electronic devices for, and this causes a loss in efficient and effective use of the electronic devices.

Accordingly, there is a need for schemes for touch sensing that factor in a user's intended use, in the infrared method.

SUMMARY

The present disclosure has been made to address at least the above needs and to provide at least the advantages described below, and an aspect of the present disclosure provides an electronic device and a touch sensing method thereof, which can sense a touch through execution of different types of firmware according to an input mode selected by a user.

According to one aspect of the present disclosure, an electronic device that senses a touch input to a screen, the electronic device comprising, a touch sensor configured to sense the touch input to the screen; a storage configured to store different firmware corresponding to a plurality of input modes supported by the touch sensor; and a controller configured to sense the touch input according to a selected input mode among the plurality of input modes, through execution of one of the different firmware corresponding to the selected input mode.

The plurality of input modes comprise a drawing mode and a touch mode.

The controller may perform a drawing operation along touched points if the selected input mode is the drawing mode, and may control objects displayed at the touched points if the selected input mode is the touch mode.

The controller may operate to sense the touch through execution of the one of the different firmware that is unable to recognize a multi-touch if the selected input mode is the drawing mode, and may operate to sense the touch through execution of the one of the different firmware that can recognize the multi-touch if the selected input mode is the touch mode.

The electronic device may be implemented by an electronic board.

According to another aspect of the present disclosure, a touch sensing method of an electronic device that senses a touch input to a screen using different firmware corresponding to a plurality of input modes, the method comprising, receiving a selection of one of the plurality of input modes; and sensing the touch according to the selected one of the plurality of input modes through execution of one of the different firmware corresponding to the selected one of the plurality of input modes.

The plurality of input modes comprise a drawing mode and a touch mode.

The touch sensing method according to the aspect of the present disclosure may further include performing a drawing operation along touched points if the selected one of the plurality of input modes is the drawing mode, and controlling objects displayed at the touched points if the selected one of the plurality of input modes is the touch mode.

The sensing may include sensing the touch input through execution of the one of the different firmware that is unable to recognize a multi-touch if the selected one of the plurality of input modes is the drawing mode, and sensing the touch input through execution of the one of the different firmware that can recognize the multi-touch if the selected one of the plurality of input modes is the touch mode.

The electronic device may be implemented by an electronic board.

The storage may be divided into a plurality of regions corresponding to respective ones of the different firmware.

The controller may pre-store addresses of the plurality of regions in which the respective ones of the different firmware are stored.

The selected input mode may be selected based on a user selecting a menu item or manipulating a button on the electronic device.

According to an exemplary embodiment, when executing the one of the different firmware that can recognize the multi-touch, an additional process for determining existence or nonexistence of ghost images may be performed and a touch sensing speed may be lowered.

According to an exemplary embodiment, when sensing the touch through execution of the one of the different firmware that can recognize the multi-touch, the method may further comprise determining existence or nonexistence of ghost images and lowering a touch sensing speed.

According to another aspect of the present disclosure, there is provided an electronic device that senses a touch input to a screen. The electronic device may comprise: a touch sensor configured to sense the touch input to the screen; respective memories configured to store respective firmware corresponding to a plurality of input modes supported by the touch sensor; and a controller configured to sense the touch input according to a selected input mode among the plurality of input modes, through execution of one of the respective firmware corresponding to the selected input mode.

As described above, according to various aspects of the present disclosure, the touch can be sensed through execution of the firmware corresponding to the selected input mode. Accordingly, a performance optimized to the user's intentions can be provided to the user.

BRIEF DESCRIPTION OF THE DRAWINGS

The above and other aspects, features and advantages of the present disclosure will be more apparent from the following detailed description when taken in conjunction with the accompanying drawings, in which.

DETAILED DESCRIPTION OF EXEMPLARY EMBODIMENTS

Hereinafter, exemplary embodiments of the present disclosure are described in detail with reference to the accompanying drawings.

Figure 1:
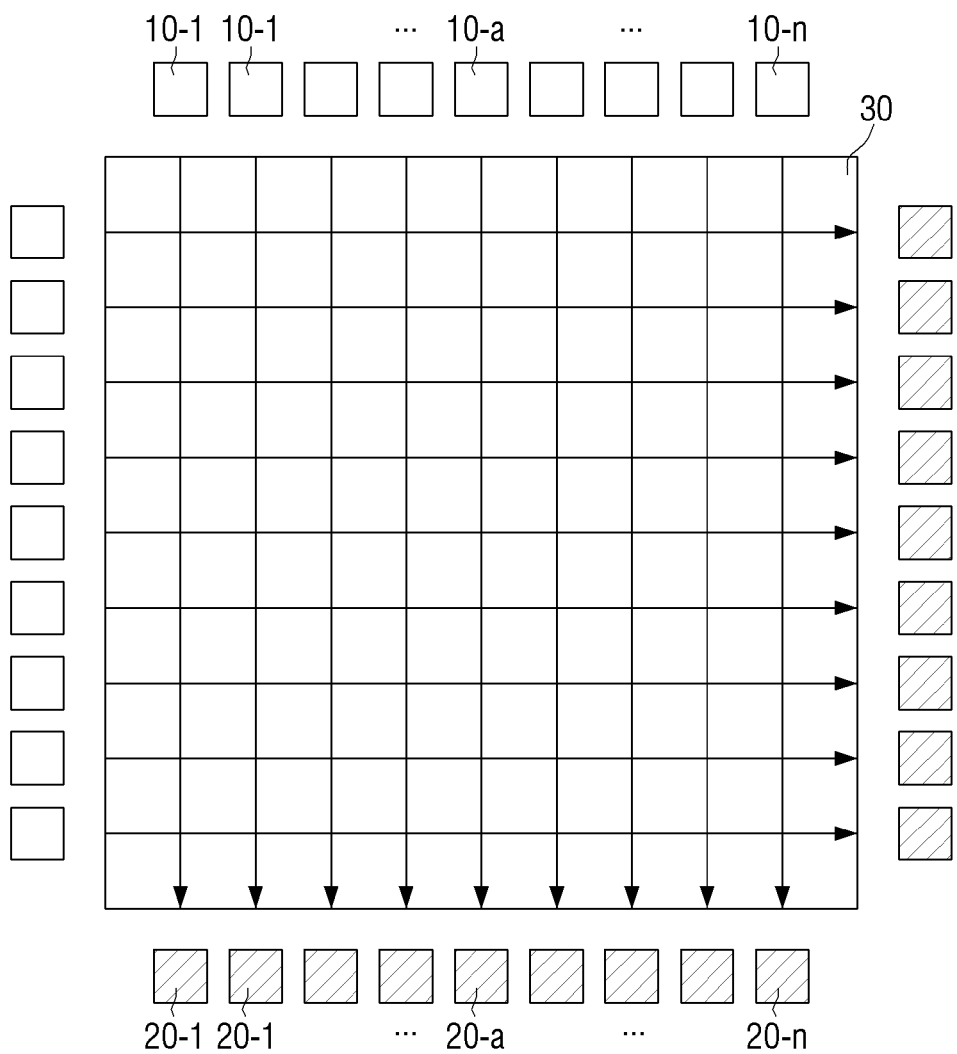
FIG. 1 is a diagram explaining a touch sensing method in an electronic device according to an exemplary embodiment of the present disclosure.

FIG. 1 is a diagram explaining a touch sensing method in an electronic device according to an exemplary embodiment of the present disclosure.

According to an exemplary embodiment of the present disclosure, an electronic device 100 may sense a touch in an infrared method.

In case of an infrared (IR) sensor method, a plurality of IR light emitters 10-1 to 10-$n$ and a plurality of IR sensors 20-1 to 20-$m$ are arranged along borders of the electronic device 100. If the IR light emitters 10-1 to 10-$n$ emit infrared rays, the IR sensors 20-1 to 20-$m$ receive the infrared rays, generate current (or voltage), and recognize the change of the current to sense a touch.

In this case, the IR light emitters 10-1 to 10-$n$ may be implemented by IR LEDs, and may be arranged on an upper portion and a left side of the electronic device 100 to be spaced apart from each other for a predetermined distance. The IR sensors 20-1 to 20-$m$ may be implemented by phototransistors, and may be arranged on a lower portion and a right side of the electronic device 100 to be spaced apart from each other for a predetermined distance.

However, such arrangements are merely exemplary and may be changed in various ways so long as the IR light emitters 10-1 to 10-$n$ and the IR sensors 20-1 to 20-$m$ are arranged to face each other.

On the other hand, if one point on a screen 30 that is provided in the electronic device 110 is touched, infrared rays emitted from the IR light emitter 10-$a$ which is arranged on the corresponding point are unable to reach the IR sensor 20-$b$. Accordingly, if the infrared rays emitted from the IR light emitter do not reach the IR sensor in the infrared method, it is considered that the screen is touched, and the touched position on the screen is calculated based on the position of the corresponding sensor.

Figure 2:
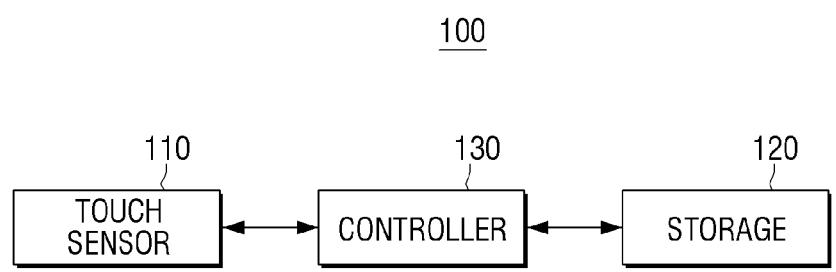
FIG. 2 is a block diagram illustrating the configuration of an electronic device according to an exemplary embodiment of the present disclosure.

FIG. 2 is a block diagram illustrating the configuration of an electronic device according to an exemplary embodiment of the present disclosure. Referring to FIG. 2, the electronic device 100 includes a touch sensor 110, a storage 120, and a controller 130.

The electronic device 100 can sense the touch that is input to the screen in the infrared method, and the driving principle in the infrared method has been described with reference to FIG. 1.

The touch sensor 110 is a configuration to sense the touch input to the screen. Specifically, the touch sensor 110 can sense the touch that is input to the electronic device 100 using the infrared method.

For this, the touch sensor 110 may be provided with the IR light emitters 10-1 to 10-$n$ (see FIG. 1) and the IR sensors 20-1 to 20-$m$ (see FIG. 1), which may be arranged on the border portion of the screen 30 (see FIG. 1) to be spaced apart from each other for a predetermined distance.

The storage 120 stores therein firmware corresponding to a plurality of input modes supported by the touch sensor 110. For this, the storage 120 may be implemented by various types of memories, such as an EEPROM (Electrically Erasable Programmable Read-Only Memory) and DDR (Double Data Rate).

Here, the plurality of input modes may include a drawing mode and a touch mode. Specifically, the drawing mode is a mode for drawing various shapes (e.g., characters or figures) on the screen through a touch operation, and the touch mode is a mode for controlling objects (e.g., menu items, icons, or images) displayed on the screen through a touch operation. For example, in the touch mode, the objects can be selected, enlarged, reduced, rotated, or moved through the touch operation.

On the other hand, the storage 120 may store therein firmware for driving the touch sensor 110 for each input mode. That is, the storage 120 may store different types of firmware for the respective input modes. As an example, the storage 120 may store a first type of firmware if the drawing mode is selected as the input mode, and may store a second type of firmware if the touch mode is selected as the input mode.

In this case, the storage 120 may be provided with a plurality of memories, and may store the different types of firmware in the respective memories. For example, the storage 120 may include a first memory in which the first type of firmware is stored and a second memory in which the second type of firmware is stored.

Further, the storage 120 may include one memory that is divided into a plurality of regions, and the different types of firmware may be stored in the respective regions. For example, the storage 120 may include a first memory region in which the first type of firmware is stored and a second memory region in which the second type of firmware is stored.

The controller 130 controls the whole operation of the electronic device 100. The controller 130 may include a microcomputer (or a microcomputer and a CPU (Central Processing Unit)), a RAM (Random Access Memory), and a ROM (Read Only Memory) for the operation of the electronic device 100. In this case, these modules may be implemented in a SoC (System on Chip) form.

In particular, the controller 130 may operate to sense the touch input to the screen.

Specifically, the controller 130 may execute the firmware stored in the storage 120, and may determine positions, coordinates, and the number of touch points input to the screen, and existence/nonexistence of ghost images through the executed firmware. For this, the controller 130 may use positions of the IR sensors 20-1 to 20-$m$ that sense the infrared rays output from the IR light emitters 10-1 to 10-$n$, and the size of sensed current (or voltage).

In this case, the controller 130 may sense the touch through execution of different types of firmware according to the input mode. That is, the controller 130 may operate to sense the touch according to the selected input mode through execution of the firmware corresponding to the selected input mode among the plurality of input modes.

Specifically, if the selected input mode is the drawing mode, the controller 130 may sense the touch through execution of the firmware that is unable to recognize a multi-touch. That is, if the drawing mode is selected as the input mode, the controller 130 may sense the touch through execution of the first type of firmware among the plural types of firmware. Here, the first type of firmware may be firmware that is unable to recognize the multi-touch.

Further, if the selected input mode is the touch mode, the controller 130 may sense the touch through execution of the firmware that can recognize the multi-touch. That is, if the touch mode is selected as the input mode, the controller 130 may sense the touch through execution of the second type of firmware among the plural types of firmware. Here, the second type of firmware may be firmware that can recognize the multi-touch.

For this, the controller 130 may pre-store addresses of the memories or memory regions in which various types of firmware are stored. Further, if the input mode is selected, the controller 130 may execute the firmware corresponding to the selected input mode through accessing the memory or the memory region in which the firmware corresponding to the selected input mode is stored.

Further, the controller 130 may be provided with an I/O port and a control pin for selecting a memo in which the firmware is stored.

On the other hand, the input mode may be selected in various ways. For example, a user may select a menu item for selecting the input mode that is displayed on the screen or may select the input mode through a button that is separately provided on the electronic device 100. Some reasons why the different types of firmware are executed according to the selected input mode are as follows.

With respect to the firmware that can recognize the multi-touch, the multi-touch can be recognized, but an additional process for determining the existence/nonexistence of the ghost images should be performed to cause the touch sensing speed to be lowered.

By contrast, with respect to the firmware that is unable to recognize the multi-touch, the touch recognition process is simplified to be advantageous in speed and performance, but it is not possible to recognize the multi-touch.

According to the present disclosure, in order to provide an optimized touch sensing function according to a user's intentions, optimized firmware in each input mode is executed according to the selected input mode.

In general, when drawing a shape on the screen, a user uses one point of a hand or a pen, and thus recognition of the multi-touch is not greatly required. In this case, there is a low possibility that a ghost image that is caused by the multi-touch is generated, and it is scarcely necessary to recognize the multi-touch. Further, since the user desires that the shape drawn on the screen through the touch is directly displayed, it is necessary to rapidly sense and process the touch.

Accordingly, if the drawing mode is selected as the input mode, the touch is sensed through execution of the firmware that is unable to recognize the multi-touch, giving priority to the touch sensing speed.

On the other hand, when controlling a plurality of objects displayed on the screen, a user intends to control the objects through a touch operation. Particularly, if the size of the screen is large, a user may use two hands to simultaneously move the objects that are far apart from the user.

Accordingly, if the touch mode is selected as the input mode, the touch is sensed through execution of the firmware that can recognize the multi-touch, giving priority to the multi-touch possibility.

On the other hand, if the selected input mode is the drawing mode, the controller 130 may perform the drawing operation along the touched points. That is, if the drawing mode is selected as the input mode, the controller 130 may determine the coordinates of the touched points on the screen and may display various types of graphical user interfaces (GUIs) along the touched points using the determined coordinates. Here, the GUIs may be lines or surfaces, and the thicknesses and the colors of the lines or surfaces can be set and changed by the user.

Further, if the selected input mode is the touch mode, the controller 130 may control the objects displayed at the touched points. In this case, the objects can be controlled in various ways according to the types of the touch operations.

For example, in case of a touch operation for tapping an object, the controller 130 may select the corresponding object. That is, if a touch operation for tapping a menu item or an icon is input, the controller 130 may display sub-menu items or may execute a function or an application program corresponding to the icon.

As another example, in case of a touch operation for touching and dragging an object, the controller 130 may move the corresponding object. That is, if a touch operation for touching and dragging an image is input, the controller 130 may move the image up to a position where the drag is released.

As still another example, in case of a touch operation for pinching in or pinching out an object, the controller 130 may enlarge or reduce the corresponding object. That is, if a touch operation for touching and pinching in/out an image is input, the controller 130 may enlarge or reduce the image.

On the other hand, in case of a touch mode, a multi-touch is recognized, and a user can simultaneously control a plurality of objects.

The screen that is provided on an electronic board 100 may be implemented in various types. For example, the screen may be implemented by an LCD display. In addition, the screen may be implemented by various types of displays, such as an organic light-emitting diode (OLED) type or a plasma display panel (PDP) type.

The electronic device 100 according to an exemplary embodiment of the present disclosure may be implemented by an electronic board. The electronic board may be installed in various places such as education spots or public institutions. If a user touches the electronic board with a hand or a pen, the electronic pen recognizes this, and performs a mouse function or the like.

For example, the electronic board may calculate the coordinates of a point that is touched by a user, may display an overlaid line at the point of the screen that is touched by the user, or may control the object displayed at the point that is touched by the user. For example, if a menu tool item is displayed at the point that is touched by the user, the electronic board may function to store or remove the overlaid line according to the touched menu tool item.

Figure 3:
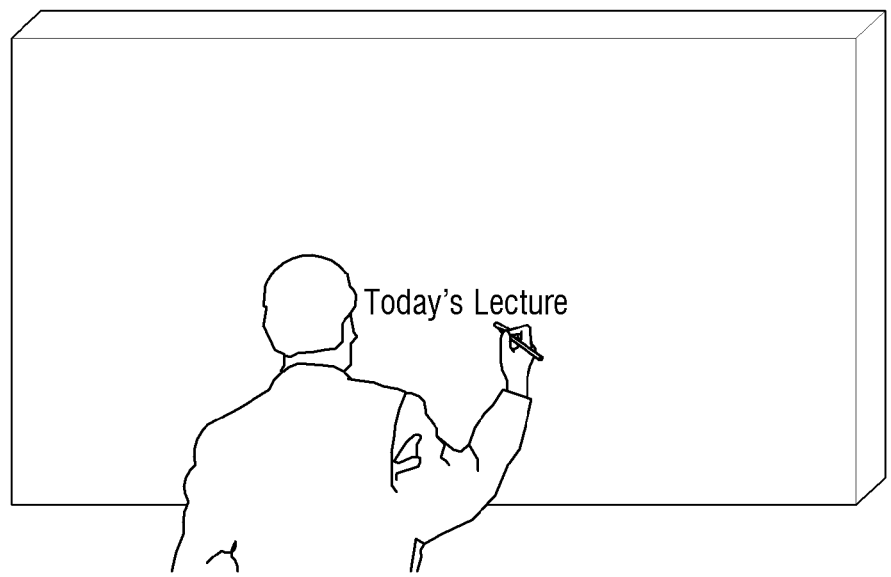
FIGS. 3, 4A and 4B are diagrams explaining the operation of an electronic device according to an exemplary embodiment of the present disclosure.
Figure 4A:
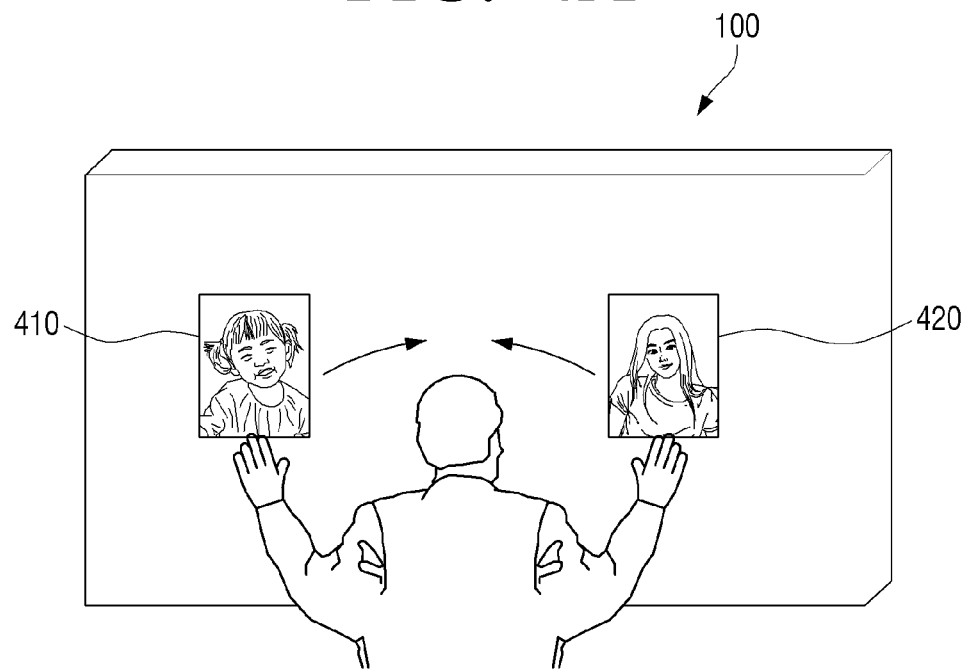
Figure 4B:
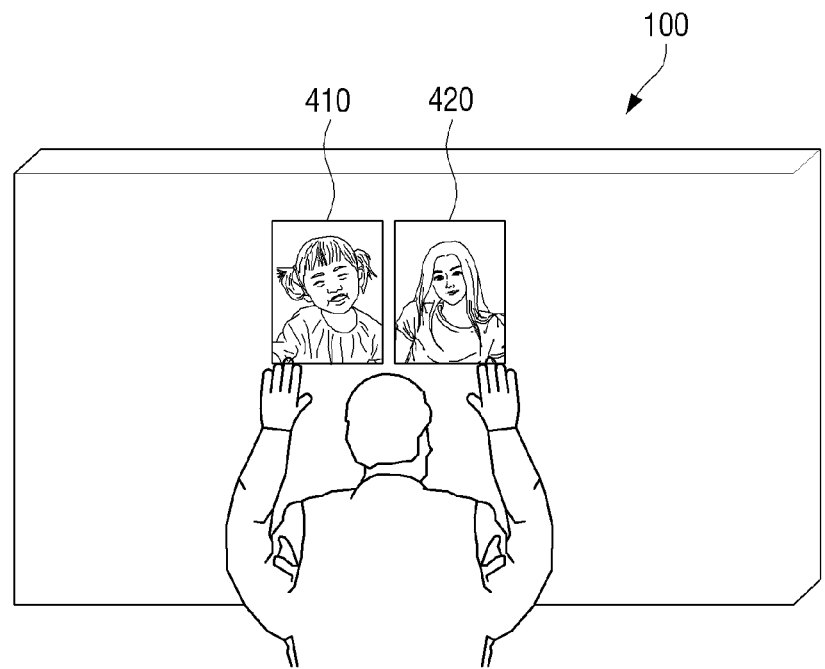

FIGS. 3, 4A and 4B are diagrams explaining the operation of an electronic device according to an exemplary embodiment of the present disclosure.

First, FIG. 3 shows an example where the electronic device 100 operates in a drawing mode. As shown in FIG. 3, if the drawing mode is selected as the input mode, the electronic device 100 may determine the touch input to the screen through execution of the firmware that is unable to recognize the multi-touch, and may display a GUI of a specific shape, for example, a line, along the points touched by the user.

On the other hand, FIGS. 4A and 4B show an example where the electronic device 100 operates in a touch mode. As shown in FIGS. 4A and 4B, if the touch mode is selected as the input mode, the electronic device 100 may determine the touch input to the screen through execution of the firmware that can recognize the multi-touch, and may perform a function that corresponds to the type of the object displayed at the point touched by the user and the type of the input touch operation.

For example, as shown in FIGS. 4A and 4B, a user may move images 410 and 420 that are displayed on both side portions of the screen to the center of the screen through a drag and drop operation. The user may move the images 410 and 420 simultaneously.

Figure 5:
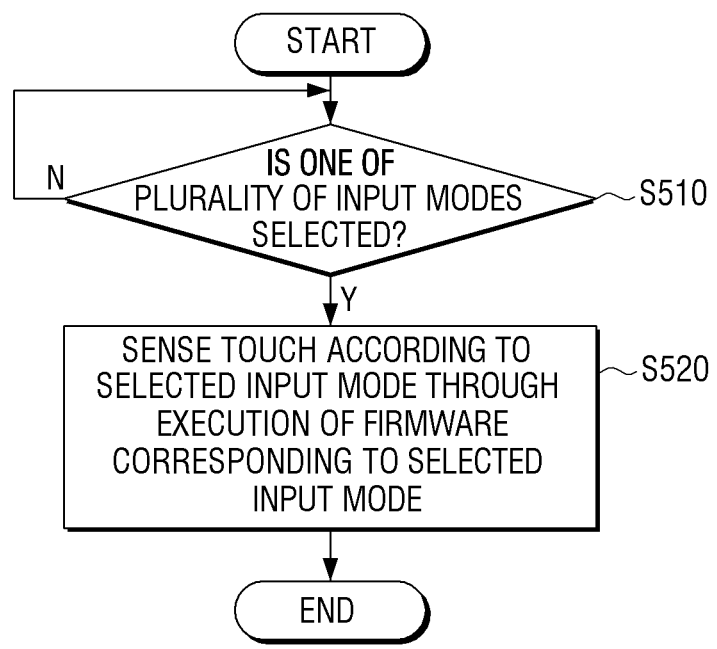
FIG. 5 is a flowchart illustrating a touch sensing method of an electronic device according to an exemplary embodiment of the present disclosure.

FIG. 5 is a flowchart illustrating a touch sensing method of an electronic device according to an exemplary embodiment of the present disclosure. Here, the electronic device may sense a touch input to a screen in an infrared method using firmware corresponding to a plurality of input modes.

First, a selection of one of the plurality of input modes is received (S510). For example, a user may select a menu item for selecting an input mode that is displayed on the screen or may select an input mode through a button separately provided on the electronic device.

Here, the plurality of input modes may include a drawing mode and a touch mode.

Thereafter, the touch may be sensed according to the selected input mode through execution of the firmware corresponding to the selected input mode.

Specifically, if the selected input mode is the drawing mode, the touch may be sensed through execution of the firmware that is unable to recognize the multi-touch, while if the selected input mode is the touch mode, the touch may be sensed through execution of the firmware that can recognize the multi-touch.

Further, if the selected input mode is the drawing mode, a drawing operation may be performed along the touched points, while if the selected input mode is the touch mode, objects displayed at the touched points may be controlled.

Further, the electronic device may be implemented by an electronic board.

Yet further, the touch sensing method that is performed by the electronic device has been described in detail with reference to FIGS. 1 to 4B.

Further, a non-transitory computer readable medium that stores a program for sequentially performing the touch sensing method according to the present disclosure may be provided.

The non-transitory computer readable medium is not a medium that stores data for a short period, such as a register, a cache, or a memory, but means a medium which semi-permanently stores data and is readable by a device. Specifically, various applications and programs as described above may be stored and provided in the non-transitory computer readable medium, such as a compact disc (CD), a digital versatile disc (DVD), a hard disc, a Blu-ray disc, a universal serial bus (USB), a memory card, and a ROM.

Further, although a bus is not illustrated in the above-described block diagram illustrating the electronic device, communication between the respective constituent elements in the electronic device may be performed through the bus. Further, each device may further include a processor, such as a CPU or a microprocessor, for performing the above-described procedures.

While the present disclosure has been shown and described with reference to the exemplary embodiments thereof, it will be understood by those skilled in the art that various changes in form and detail may be made therein without departing from the spirit and scope of the present disclosure, as defined by the appended claims.

What is claimed is:

1. An electronic device that senses a touch input to a screen, the electronic device comprising:
   a touch sensor configured to sense the touch input to the screen;
   a storage configured to store different firmware corresponding to a plurality of input modes supported by the touch sensor; and
   a controller configured to, in response to an input mode being selected from among the plurality of input modes by a user, sense the touch input according to the selected input mode among the plurality of input modes, through execution of one of the different firmware corresponding to the selected input mode,
   wherein the plurality of input modes comprise a drawing mode and a touch mode,
   wherein the controller operates to sense the touch input through execution of a first firmware that is unable to recognize a multi-touch if the selected input mode is the drawing mode, and operates to sense the touch input through execution of a second firmware that can recognize the multi-touch if the selected input mode is the touch mode, and
   wherein the first firmware has a first touch sensing speed and the second firmware has a second touch sensing speed that is different from the first touch sensing speed.

2. The electronic device as claimed in claim 1, wherein the controller performs a drawing operation along touched points if the selected input mode is the drawing mode, and controls objects displayed at the touched points if the selected input mode is the touch mode.

3. The electronic device as claimed in claim 1, wherein the electronic device is implemented by an electronic board.

4. The electronic device as claimed in claim 1, wherein the storage is divided into a plurality of regions corresponding to respective ones of the different firmware.

5. The electronic device as claimed in claim 4, wherein the controller pre-stores addresses of the plurality of regions in which the respective ones of the different firmware are stored.

6. The electronic device as claimed in claim 1, wherein the selected input mode is selected based on a user selecting a menu item or manipulating a button on the electronic device.

7. The electronic device as claimed in claim 1, wherein when executing the one of the different firmware that can recognize the multi-touch, an additional process for determining existence or nonexistence of ghost images is performed and a touch sensing speed is lowered.

8. A touch sensing method of an electronic device that senses a touch input to a screen using different firmware corresponding to a plurality of input modes, the method comprising:
   receiving a selection of one of the plurality of input modes; and
   sensing the touch input according to the selected one of the plurality of input modes through execution of one of the different firmware corresponding to the selected one of the plurality of input modes, wherein the plurality of input modes comprise a drawing mode and a touch mode, and wherein the sensing comprises sensing the touch input through execution of a first firmware that is unable to recognize a multi-touch if the selected one of the plurality of input modes is the drawing mode, and sensing the touch input through execution of a second firmware that can recognize the multi-touch if the selected one of the plurality of input modes is the touch mode, and wherein the first firmware has a first touch sensing speed and the second firmware has a second touch sensing speed that is different from the first touch sensing speed.

9. The touch sensing method as claimed in claim 8, further comprising performing a drawing operation along touched points if the selected one of the plurality of input modes is the drawing mode, and controlling objects displayed at the touched points if the selected one of the plurality of input modes is the touch mode.

10. The touch sensing method as claimed in claim 8, wherein the electronic device is implemented by an electronic board.

11. The method as claimed in claim 8, wherein when sensing the touch input through execution of the one of the different firmware that can recognize the multi-touch, the method further comprises determining existence or nonexistence of ghost images and lowering a touch sensing speed.

12. An electronic device that senses a touch input to a screen, the electronic device comprising:
a touch sensor configured to sense the touch input to the screen;
respective memories configured to store respective firmware corresponding to a plurality of input modes supported by the touch sensor; and
a controller configured to, in response to an input mode being selected from among the plurality of input modes by a user, sense the touch input according to the selected input mode among the plurality of input modes, through execution of one of the respective firmware corresponding to the selected input mode, wherein the plurality of input modes comprise a drawing mode and a touch mode, wherein the controller operates to sense the touch through execution of a first firmware that is unable to recognize a multi-touch if the selected input mode is the drawing mode, and operates to sense the touch through execution of a second firmware that can recognize the multi-touch if the selected input mode is the touch mode, and wherein the first firmware has a first touch sensing speed and the second firmware has a second touch sensing speed that is different from the first touch sensing speed.

13. The electronic device as claimed in claim 12, wherein the controller performs a drawing operation along touched points if the selected input mode is the drawing mode, and controls objects displayed at the touched points if the selected input mode is the touch mode.

14. The electronic device as claimed in claim 12, wherein the electronic device is implemented by an electronic board.

* * * * *